(12) United States Patent
Chen

(10) Patent No.: US 11,651,424 B2
(45) Date of Patent: May 16, 2023

(54) UNIFIED PAYMENT ACCOUNT ESTABLISHMENT AND INCORPORATION IN A MAIN PAYMENT ACCOUNT

(71) Applicant: PAYPAL, INC., San Jose, CA (US)

(72) Inventor: Hsiao Chen, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 450 days.

(21) Appl. No.: 16/675,046

(22) Filed: Nov. 5, 2019

(65) Prior Publication Data

US 2020/0074538 A1 Mar. 5, 2020

Related U.S. Application Data

(63) Continuation of application No. 14/586,899, filed on Dec. 30, 2014, now Pat. No. 10,467,689.

(60) Provisional application No. 62/000,873, filed on May 20, 2014.

(51) Int. Cl.
*G06Q 20/22* (2012.01)
*G06Q 20/32* (2012.01)
*G06Q 40/02* (2023.01)
*G06Q 20/08* (2012.01)
*G06Q 20/10* (2012.01)

(52) U.S. Cl.
CPC ............ *G06Q 40/02* (2013.01); *G06Q 20/08* (2013.01); *G06Q 20/10* (2013.01); *G06Q 20/22* (2013.01); *G06Q 20/227* (2013.01)

(58) Field of Classification Search
None
See application file for complete search history.

(56) References Cited

U.S. PATENT DOCUMENTS

| | | |
|---|---|---|
| 8,606,720 B1 | 12/2013 | Baker et al. |
| 2012/0084135 A1 | 4/2012 | Nissan et al. |
| 2013/0024366 A1 | 1/2013 | Mukherjee et al. |
| 2013/0054454 A1 | 2/2013 | Purves et al. |
| 2013/0132274 A1 | 5/2013 | Henderson et al. |
| 2013/0275199 A1 | 10/2013 | Proctor, Jr. et al. |
| 2015/0199672 A1* | 7/2015 | Woloshin ............... H04W 4/80 705/39 |
| 2016/0042344 A1 | 2/2016 | Thimmana et al. |

\* cited by examiner

*Primary Examiner* — Joseph W. King
(74) *Attorney, Agent, or Firm* — Haynes and Boone, LLP

(57) ABSTRACT

There is provided systems and method for unified payment account establishment and incorporation in a main payment account. A service provider, such as a payment provider, may offer merchants with a development kit that unifies payment methods between various merchants and the service provider so that users are provided with more easily established payment accounts with the merchants. The development kit may include an account establishment interface that may be utilized in a merchant ordering and payment application for a merchant. The interface may provide for establishment of a payment account with the merchant. When initially establishing the payment account, the user may generate a provisional account, which may be synchronized to a payment account the user has with the service provider. When synchronizing the two accounts, the user may transfer information to the merchant, which may be redacted to prevent the merchant from receiving sensitive information.

20 Claims, 5 Drawing Sheets

UNIFIED PAYMENT ACCOUNT ESTABLISHMENT AND INCORPORATION IN A MAIN PAYMENT ACCOUNT

CROSS REFERENCE TO RELATED APPLICATION

The present application is a continuation of and claims priority to U.S. patent application Ser. No. 14/586,899, filed Dec. 30, 2014, which claims priority to U.S. Provisional Patent Application Ser. No. 62/000,873, filed May 20, 2014, which is incorporated by reference in its entirety.

TECHNICAL FIELD

Example embodiments of the present application relate generally to unified payment account establishment and incorporation in a main payment account, and more specifically to providing merchants with account establishment procedures and shared account information between a payment provider and a merchant so the merchant may provide more specialized services to a user.

BACKGROUND

A user may establish an account with a merchant during checkout and payment with the merchant. For example, a user may wish to purchase items from a merchant and supply the merchant with various amounts of personal and/or financial information. However, the account established with the merchant may be a bare bones account that merely includes information provided to the merchant and transaction histories (e.g., receipts) with the merchant. The merchant may be unaware of additional information, benefits, and/or payment instruments available to the user. Moreover, if the user selects to pay for the items using cash or a payment card, a payment provider offering financial transaction processing to the user may be unaware of the account features with the merchant. Thus, any accrued rewards, updates to personal information, and/or new payment instruments, may not be added to a payment account/wallet and shared with the payment provider, which may be detrimental to the user.

Additionally, with the number of merchants offering payment systems using online accounts and mobile phones, users may have a vast amount of different accounts, each requiring time to set up and enter information. Users may choose to forego setting up payment accounts or may choose to enter one-time payment information that generates only a single payment and does not establish an account with the merchant. Thus, merchants may miss opportunities to upsell to customers and customers may not receive benefits they would otherwise accrue. Moreover, substandard payment and checkout applications may not offer users the benefits associated with better applications.

Figure 1:
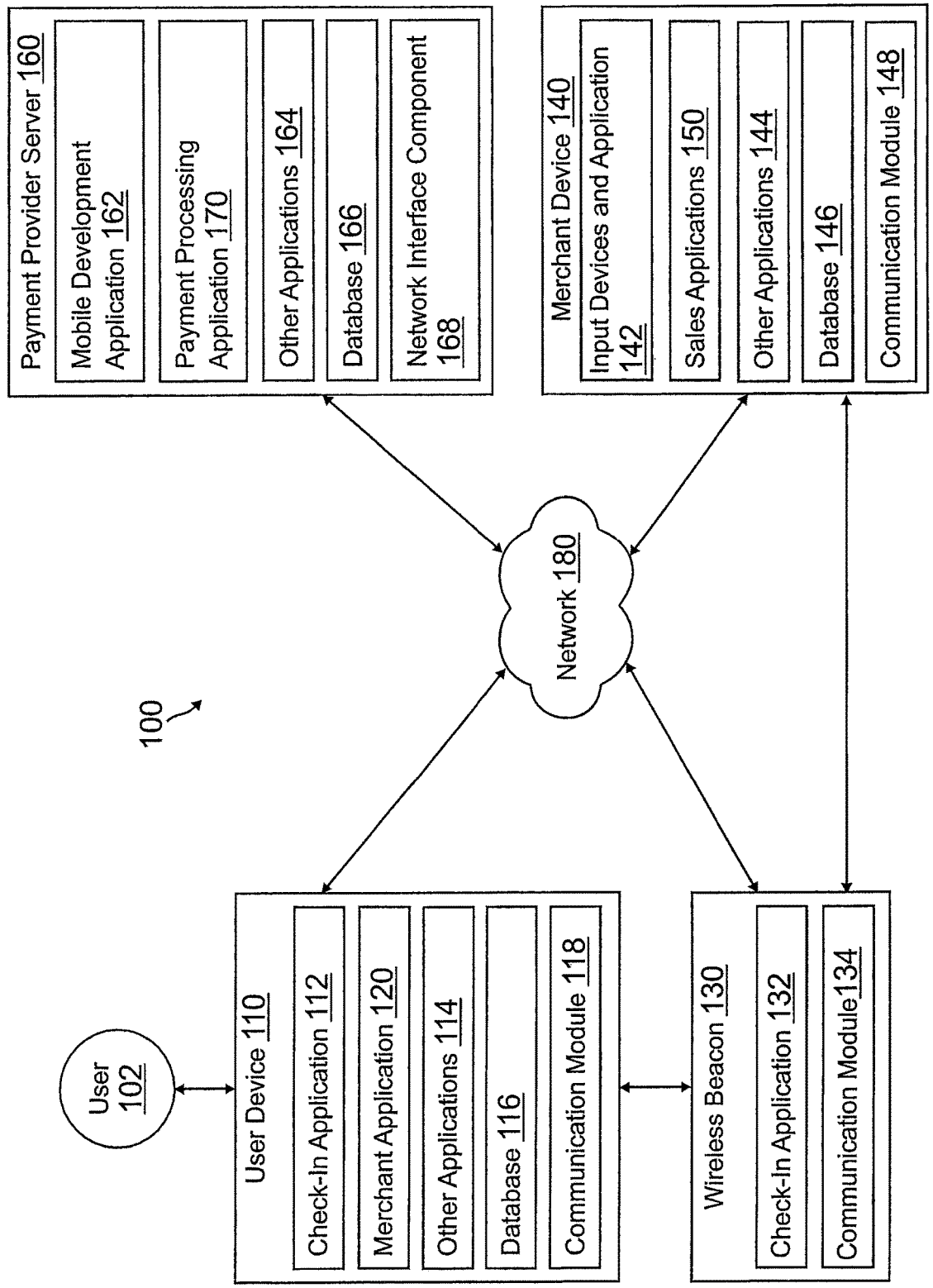
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for selection for unified payment account establishment and incorporation in a main payment account. Systems suitable for practicing methods of the present disclosure are also provided.

A service provider, such as a payment provider, may offer merchants a development kit that includes various processes and features the merchants may implement in mobile applications that offer ordering, payment, and account establishment with the merchant to consumers. A merchant may utilize the development kit to receive a payment application, including an account establishment application interface. The merchant may implement the development kit in a merchant application so that the merchant may utilize the account establishment application interface within the merchant application. This allows for the merchant to provide for user account establishment (e.g., an account where a user may place orders, complete payments, and accrue benefits), information entry, and payment methods to be implemented using the payment provider. The account establishment application interface in the merchant application may allow for a user to enter personal and/or financial information in order to effectuate payments to the merchant. The interface may also allow for the user to enter information for an established payment account with the payment provider, which may then be utilized to generate an account with the merchant for use in orders and payments. If the user has previously created an account with the merchant, the user may also synchronize their provisional account with the merchant with their payment account with the payment provider. The merchant may also receive access to information with the payment provider that it may not normally have, and the user may expedite the establishment of an account with the merchant using the payment account with the payment provider.

Thus, the payment provider may enable the merchant to synchronize a provisional account established with the merchant during checkout and payment with a payment account established with the payment provider. For example, a user, such as a consumer, may engage in a transaction with a merchant that may establish an account with the merchant. The user may establish the account by first utilizing a merchant application to enter in purchasable item information (e.g., items the user wishes to purchase), personal information for the user, and/or financial information to complete the transaction. As previously discussed, the merchant application may implement a user interface for account creation offered by the payment provider. The merchant application may be configured to enable the user to select and pay for the items, thus generating a transaction history (e.g., receipt). The user may then visit a merchant location, where a wireless beacon (e.g., a BLE, LTE Direct, near field communication, or other beacon) may connect to the user device and load the transaction history to a merchant device at the merchant location, thus allowing the user to receive the items. The user may also present payment codes or identification to the merchant to present proof of purchase. In other embodiments, the user may simply checkout for the items, selecting a pickup place, time, or other parameter but not provide payment for the items. The user may then provide payment when the user arrives at the merchant location and the wireless beacon connects to the user device. The user may also modify and confirm the order at the merchant location, for example, through an intercom system or ordering window. The merchant may be able to upsell to the consumer through the merchant application and/or offer benefits to the user that may be redeemed during ordering.

Once an account is generated with the merchant, the merchant application may include information for the provisional account. The provisional account may include a profile for the user, a digital wallet including payment instruments, coupons, discounts, or other payment related information, and a transaction history for previous or current purchases with the merchant. The user may then choose to log in to the payment provider in order to share the provisional account information with an account the user has established with the payment provider. In other embodiments, the user may not have previously established a provisional account with the merchant, and thus account sharing and synchronization may occur when the user establishes the provisional account. For example, when establishing a user account, the user may be offered to "log in" using the payment provider, where the user's provisional account with the merchant is immediately synchronized to a previous payment account with the payment provider using the entered credentials for the payment account. Synchronization of accounts may share the provisional account's profile information, digital wallet, and transaction histories with the payment account's profile information, digital wallet, and transaction histories. Thus, the most recent information may be updated, or the profile, digital wallet, and/or transaction histories may be updated to reflect information in one account that is not possessed by the other account. In other embodiments, the merchant's application may immediately establish the account with the payment provider so that information entered in the merchant application (e.g., for the provisional account) is immediately shared with the payment provider and synchronized with the payment account held by the payment provider.

The merchant may therefore have access to a user profile and history for the user. However, the merchant may be prevented from obtaining certain information, such as sensitive payment instrument information not originally shared with the merchant (e.g., a payment card the user has chosen to not share with the merchant and/or a payment card the user has not previously used with the merchant). Other sensitive information that may be redacted from sharing with the provisional account may include receipts in the user's transaction history with other merchant. Thus, other merchant's assets, transaction histories, names, or other information that may identify another merchant the user shops with may remain unknown to the merchant. This may prevent merchant competition and foster merchant integration with the payment provider if they know that their assets, information, transaction histories, and/or analytics are not being shared with another merchant. However, the merchant may have access to the merchant specific assets for that merchant, such as offers, loyalty accounts, gifts, discounts, coupons, etc., so that the merchant may advertise and upsell to the user using those assets. Additionally, the merchant may review transaction histories to establish common orders by the user, items the user may be interested in, or potential advertising that may increase a likelihood that the user shops with the merchant.

Thus, when the user utilizes the merchant's application, the user may view a standard order or orders that the merchant populates with commonly purchased items by the user. This may expedite future purchases with the merchant. Additionally, when the user views items and/or standard orders, the merchant may attempt to upsell or advertise items that may be of interest to the user. The user may add the items that the merchant advertises to the user to a purchase order, or may save the items for viewing with a future purchase order.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a wireless beacon 130, a merchant device 140, and a payment provider server 160, in communication over a network 180. User 102, such as a consumer, may utilize user device 110 to utilize an application with merchant device 140 to checkout and pay for items with merchant device 140. The merchant application may implement features and/or process offered by payment provider server 160. When completing checkout, user 102 establishes an account for merchant device 140 to complete payment. The account may be a provisional account that is held by merchant device 140. In other embodiments, user 102 may log in using an account with payment provider server 160 to establish the account for merchant device 140. If user 102 establishes the provisional account with merchant device 140 directly, user 102 may also later choose to share the account with payment provider server 160. Merchant device 140 may then utilize information from payment provider server 160 to advertise, upsell, and complete transactions with user 102.

User device 110, merchant device 140, and payment provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

User device 110 may be implemented using any appropriate hardware and software configured for wired and/or wireless communication with wireless beacon 130, merchant device 140, and/or payment provider server 160. For example, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 112, a merchant application 120, other applications 114, a database 116, and a network component interface. Check-in application 112, merchant application 120, and other applications 114 may correspond to processes, procedures, and/or applications, for example, a software program, executable by a hardware processor. In other embodiments, user device 110 may include additional or different software as required.

Check-in application 112 may be used by user 102 of user device 110 to establish a connection with wireless beacon 130, including a check-in with a merchant location for wireless beacon 130/merchant device 140. Check-in application 112 may correspond to a specific application utilized by user device 110 with wireless beacon 130 and/or merchant device 140 to complete a check-in. The check-in may correspond to a process to log in to a user account of user 102 with merchant device 140 (or payment provider server 160 if payment provider server 160 provides check-in services for the merchant location). The user account may be established by user 102 using merchant application 120, as will be explained in more detail herein. In other embodiments, the check-in may provide and/or verify the identity of user 102, including transmission of an identifier for user 102 and/or user device 110. The check-in may be completed over network 180 with merchant device 140. In such embodiments, check-in application 112 may correspond more generally to a browser application configured to communicate with merchant device 140 over network 180.

In various embodiments, check-in application 112 may also receive short range wireless communications from wireless beacon 130 at the merchant location and transmit information to wireless beacon 130, including check-in information for a check-in process with the merchant location for wireless beacon 130/merchant device 140 (or payment provider server 160 if payment provider server 160 provides check-in services for the merchant location) that associates user 102 with the merchant location. For example, wireless beacon 130 may be located at the merchant location and set up to communicate with user device 110 when user device 110 is in proximity to wireless beacon 130. Merchant device 140 may determine that user 102 is located in proximity to wireless beacon 130 using the connection. Further using the connection, an order for user 102 generated through merchant application 120 may be loaded to merchant device 140 for fulfillment by the merchant for merchant device 140. In other embodiments, user 102 may utilize a payment code, transaction history, or other information in merchant application 120 to present the order to merchant device 140. User 102 may utilize merchant application 120 to provide payment for the order, as will be explained in more detail herein.

Check-in application 112 may execute in the background of an operating system of user device 110 and be configured to establish connections, using communication module 118 of user device 110, with wireless beacon 130. The connection may be established with or without user input from user 102. For example, wireless beacon 130 may broadcast a token, such as a universally unique identifier (UUID), for reception by check-in application 112, as will be explained in more detail herein. Check-in application 112 may utilize communication module 118 of user device 110 to receive the token from wireless beacon 130. If check-in application 112 acknowledges the UUID as identifying wireless beacon 130, merchant device 140, and/or payment provider server 160 (e.g., if check-in application 112 determines the UUID corresponds to a request to establish a communication channel and/or process and complete a check-in), check-in application 112 may transmit an identifier corresponding to user 102 and/or user device 110 back to wireless beacon 130. Check-in application 112 may utilize communication module 118 of user device 110 to communicate with wireless beacon 130 (e.g., over near field communication, Bluetooth, Bluetooth Low Energy, radio, infrared, LTE Direct, or other communication protocol). The identifier from user device 110 may include, be transmitted with, concatenated with, or otherwise bundled with the identifier received from wireless beacon 130. In other embodiments, different information may be transmitted to wireless beacon 130, such as an identifier for user 102, a name or other personal information for user 102, account information for user 102, a receipt/transaction history for an order by user 102, or other identifying information. Thus, the information transmitted to wireless beacon 130 does not need to be utilized to process and/or complete a check-in with merchant device 140 in all embodiments. For example, the information may be utilized to transmit or recall an order with merchant device 140 for fulfillment.

Once a connection is established with wireless beacon 130, user device 110 may be checked-in with merchant device 140 if user 102 has not previously been checked-in. The process may associate user 102 with wireless beacon 130 used to connect to user device 110 thereby information merchant device 140 that user 102 is at the merchant location for wireless beacon 130/merchant device 140. As previously discussed, in other embodiments, a check-in need not be processed and/or completed to associate user 102 with the area. Thus, other connections and data transfers to wireless beacon 130 may be sufficient to associate user 102 with the merchant location.

Merchant application 120 may be used, for example, to provide a convenient interface to permit merchant device 140 to enter, view, edit, and/or present information for items and/or services offered by merchant device 140 to user 102. For example, merchant application 120 may be implemented as a dedicated shopping application, website, or merchant marketplace for the merchant associated with merchant device 140. User 102 may utilize merchant application 120 to order to purchase items (e.g., merchandise, goods, services, etc.). In this respect, merchant application 120 may receive information from merchant device 140 having available items for purchase from merchant device 140 with corresponding item information. The item information may include price, description, available inventory, sales/discount information, etc. Merchant application 120 may correspond to an application or website for a specific merchant (e.g., a retail provider) or may correspond to an online marketplace where a plurality or merchants and/or users may sell items (e.g., EBAY® and/or STUBHUB®). In other embodiments, merchant application 120 may correspond to a web browser application configured to view information over the Internet.

When utilizing merchant application 120 to checkout and complete a payment with merchant device 140, user 102 may enter personal and/or financial information that may be utilize to generate a profile for user 102 and a digital wallet with payment instruments and other payment benefits. While completing the checkout, user 102 may be offered the option of establishing a provisional account with the merchant and/or logging in to a payment account with payment provider server 160. The option may be presented to user 102 in an account establishment application interface for merchant application 120. The interface may be provided to merchant device 140 for use in merchant application 120 by payment provider server 160, as will be explained in more detail herein.

Thus, when establishing an account with the merchant, user 102 may select among various options. If user 102 selects to establish a provisional merchant account, user device 110 and merchant device 140 may establish the provisional merchant account and complete the payment to generate one or more transaction histories stored with the provisional merchant account. User 102 may then choose to not share the provisional account with payment provider server 160, whereby payment provider server 160 may not interact with merchant device 140 to receive information about the merchant account held by merchant device 140 for user 102. However, user 102 may also later choose to synchronize the provisional merchant account with payment provider server 160. If user 102 chooses to synchronize the accounts, information in the provisional account will be shared with payment provider server 160 and vice versa. Thus, the profile, digital wallet, and transaction histories may be merged with a payment account with payment provider server 160. Profile, wallet (e.g., payment and/or benefits with the merchant), and/or transaction histories with the merchant may be updated in the merchant account and/or the payment account to insure accurate information. Thus, merchant device 140 and/or payment provider server 160 may receive update profile, wallet, and history information based on the most relevant information.

Alternatively, user 102 may choose to "log in" to the payment account with payment provider server 160 on checkout with merchant application 120. By logging in to the payment account with payment provider server 160, information for the payment account with payment provider server 160 may be utilized to generate and establish a merchant account with merchant device 140. Thus, logging in to the payment account may cause the entered information in the account establishment application interface of merchant application 120 to be matched with the payment accounts information and missing information to be populated to the merchant account with merchant device 140. Merchant device 140 may receive the most relevant information for the profile, wallet, and histories.

In various embodiments, payment provider server 160 may redact or omit information from the payment account before sharing, updating, and/or generating the merchant account. For example, the payment account may include information about private or sensitive payment instruments, such as a bank account, that user 102 does not wish to use with merchant application 120 and/or merchant device 140. Additionally, the payment account may include transaction histories for orders and/or payments with other merchants, including competitors of the merchant for merchant device 140. Moreover, profile information in the payment account may be extensive, while user 102 only wishes to share basic name information with merchant device 140. Thus, an address, birthdate, etc., may constitute private information that user 102 does not wish to share. User 102 may utilize the payment account with payment provider server 160 to set privacy settings and shared information for merchant accounts. However, in certain embodiments, user 102 may make selections of shared information while creating the account using merchant application 120.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 180, or other types of applications. Other applications 114 may also include email, texting, voice and IM applications that allow a user to send and receive emails, calls, texts, and other notifications through network 180. In various embodiments, other applications 114 may include financial applications, such as banking, online payments, money transfer, or other applications associated with payment provider server 160. Additionally, other applications 114 may include social media, browser, and/or mapping applications. Other applications 114 may contain other software programs, executable by a processor, including a graphical user interface (GUI) configured to provide an interface to the user.

User device 110 may further include database 116 which may include, for example, identifiers such as operating system registry entries, cookies associated with merchant application 120 and/or other applications 114, identifiers associated with hardware of user device 110, or other appropriate identifiers, such as identifiers used for payment/user/device authentication or identification. In one embodiment, identifiers in database 116 may be used by merchant device 140 and/or payment provider server 160 to associate user device 110 with a particular account maintained by merchant device 140/payment provider server 160. Database 116 may include user device tokens and/or encryption keys, including an encryption key of wireless beacon 130, merchant device 140, and/or payment provider server 160. Database 116 may include identifying information for tokens enabling check-in application 112 to identify wireless beacon 130, merchant device 140, and/or payment provider server 160 when receiving a corresponding check-in token. In various embodiments, database 116 may further include information for merchant application 120, for example, database 116 may include available item information for items purchasable by user 102. Additionally, database 116 may store information for provisional merchant accounts with merchant device 140 and/or payment accounts with payment provider server 160. Database 116 may also include information for use with merchant device 140, such as transaction histories, orders, and/or identifying codes used to recall an order and/or payment for fulfillment by the merchant for merchant device 140.

In various embodiments, user device 110 includes at least one network interface component 118 adapted to communicate with wireless beacon 130, payment provider server 160 and/or merchant device 140. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 130 using short range communications, such as Bluetooth Low Energy, LTE Direct, radio frequency, infrared, Bluetooth, and near field communications.

Wireless beacon 130 may be maintained, for example, by a merchant corresponding to merchant device 140, such as a merchant associated with a merchant location where wireless beacon 130 may be established. Wireless beacon 130 may be implemented using any appropriate hardware and software configured for wireless communication with user device 110, merchant device 140, and/or payment provider server 160. For example, in one embodiment, wireless beacon 130 may be implemented as a dongle device including a hardware processor and a communication module, for example, connected to a device at the merchant location (e.g., merchant device 140). Wireless beacon 130 may also be implemented as a device incorporated within a personal computer (PC), a smart phone, laptop computer, and/or other types of computing devices capable of transmitting and/or receiving data, such as an IPAD® from APPLE®. Wireless beacon 130 may also act as a stand-alone device including a processor, communication module, and/or network interface component configured to communicate with user device 110, merchant device 140, and/or payment provider server 160. Although a single beacon is described, a plurality of wireless beacons may be utilized at the merchant location.

Wireless beacon 130 may be located at a physical location corresponding to merchant device 140. The physical location may correspond to a merchant location, such as a retail store, restaurant, etc. Wireless beacon 130 of FIG. 1 contains processes, procedures, and/or applications, for example, a software program, executable by a hardware processor configured to interact with user device 110, merchant device 140, and/or payment provider server 160. Thus, regardless of the implementation of wireless beacon 130, as discussed above, wireless beacon 130 utilizes a check-in application 132 and a communication module 134. In other embodiments, wireless beacon 130 may include additional or different software and devices as required.

Check-in application 132 may correspond to an application for transmitting requests to establish a connection between a device (e.g., user device 110) and wireless beacon 130. Thus, wireless beacon 130 may utilize short range wireless communications of wireless beacon 130 to transmit the requests to establish a connection, including an identifier such as a Universally Unique Identifier (UUID). If user device 110 receives a request to establish the connection with wireless beacon 130 and responds with a user device identifier (potentially including the UUID and other information necessary to effectuate a check-in of user device 110), check-in application 132 may cause wireless beacon 130 to ramp up in power and create a connection between user device 110 and wireless beacon 130.

Wireless beacon 130 may transmit the request to establish the connection with wireless beacon 130 as a short range wireless communication (e.g. a BLE protocol communication) including a "wake up" process for check-in application 120 of user device 110 and/or a token for wireless beacon 130. In other embodiments, the request and/or connection may utilize near field communication, radio communication, infrared communication, Bluetooth communication, or WiFi communication. Additionally, although wireless beacon 130 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 130 (e.g., user device 110) and establishment of a connection for data transfers.

The request may be specific to user device 110 by including information that is specific to user 102, such as a name, identifier, user account identifier, or user device identifier. The information specific to user 102 may be determined from a user account of user 102 or other information previously provided to merchant device 140 (e.g., a provisional merchant account or a synchronized merchant account) and/or payment provider server 160 (e.g., a payment account). Thus, in certain embodiments, only user device 110 will pick up and authenticate the request. After check-in application 132 receives a user device identifier from user device 110, check-in application 132 may determine user 102 is in proximity to wireless beacon 130. Wireless beacon 130 may pass the user device identifier to merchant device 140 (or payment provider server 160 where payment provider server 160 provides the check-in services) to complete the check-in process. As shown in FIG. 1, wireless beacon 130 may utilize communication module 134 to pass the identifier to merchant device 140, which may then pass the identifier to payment provider server 160. However, in other embodiments, wireless beacon 130 may utilize a network connection of wireless beacon 130 to pass the identifier to payment provider server 160 directly. Additionally, check-in application 132 may cause wireless beacon 130 to keep a communication channel open between user device 110, merchant device 140, and/or payment provider server 160 for passing additional information, such as application information for user device 110 and/or incentives and offers from merchant device 140/payment provider server 160.

In various embodiments, wireless beacon 130 includes at least one communication module 134 adapted to communicate with user device 110, merchant device 140, and/or payment provider server 160. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 134 may communicate with user device 110 and/or merchant device 140 using short range communications, such as radio frequency, infrared, Bluetooth, and near field communications.

Merchant device 140 may be implemented using any appropriate hardware and software configured for wired and/or wireless communication with user device 110, wireless beacon 130, and/or payment provider server 160. Merchant device 140 may correspond to a device utilized to offer account services to user 102. Merchant device 140 may further be used to process orders and payments for the orders submitted by user 102. Thus, merchant device 140 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly.

Merchant device 140 of FIG. 1 contains input devices and application 142, a sales application 150, other applications 144, a database 146, and a network interface component 148. Input devices and applications 142, sales application 150, and other applications 144 may correspond to processes, procedures, and/or applications, for example, a software program, executable by a hardware processor. In other embodiments, merchant device 140 may include additional or different software as required.

Input devices and applications 142 may correspond to devices and their corresponding applications enabling user 102 and/or a merchant associated with merchant device 140 to enter information to merchant device 140. In this respect, input devices and applications 142 may include keyboards, register consoles, and/or other direct data input devices/applications. Input devices and applications 142 may also include infrared input scanners, cameras, and/or other optical and/or sound recognition devices that may receive data from user 102 for use in receiving and/or recalling a submitted order and/or payment for user 102. Input devices and applications 142 may therefore receive input from user 102 and/or the merchant, which may be processed by merchant device 140 and used to determine an order for user 102. Once the input is received by input devices and applications 142, the merchant may view and fulfill the order for user 102.

Sales application 150 may be used, for example, to provide a convenient interface to permit a merchant correspond to merchant device 140 to enter, view, and/or edit information for items and/or services purchased by user 102. In this regard, sales application 150 may receive and/or recall an order using input received from input devices and application 142. In various embodiments, the input and/or order may be received from user device 110, wireless beacon 130, and/or payment provider server 160. Thus, sales application 150 may be implemented as an application having an API accessible by merchant application 120, wireless beacon 130, input devices and applications 142, and/or payment provider server 150 that may receive information from the aforementioned sources. Sales application 150 may also provide information to merchant application 120 for presentation to user 102, such as a menu of available items, prices for available items, pick-up/delivery information, benefits based on purchases by user 102, advertising and upselling to user 102, and/or merchant account services for user 102. Such information may enable user 102 to make selections and generate a purchase order for items available from merchant device 140. Sales application 150 may also provide merchant application 120, or another source may provide merchant application 120, for example, an online application library, store, or website. Once user 102 has generated a purchase order using merchant application 120, user 102 may be required to checkout and pay for the items.

When checking out and paying for the items with merchant device 140, user 102 may be required to present information to merchant device 140 for completion of the purchase order. As previously discussed, user 102 may be giving three options within merchant application 120 to establish a merchant account with merchant device 140 by sales application 150. User 102 may establish a provisional account by providing personal and/or financial information to sales application 150 through merchant application 120. In such embodiments, user 102 may choose to not further link the provisional merchant account to a payment account with payment provider server 160. However, user 102 may also synchronize the provisional merchant account with a payment account with payment provider server 160, either on establishment of the merchant account (e.g., right away when creating the provisional merchant account through a "log in" process to the payment account with payment provider server 160) or may later access a payment account with payment provider server 160 through a synchronization process in merchant application 120. Thus payment provider server 160 may provide sales application 150 with information from a payment account with payment provider server 160 in order to update and synchronize the provisional merchant account. The provisional or synchronized merchant account may then be used to checkout and complete the purchase order.

When establishing the merchant account, a profile for user 102 may be determined, having information such as a name, address, birthdate, interests, and/or desired items for user 102. The merchant account may further include a digital wallet having payment instruments for user 102 (e.g., payment cards, payment accounts, bank accounts, etc.), benefits, received offers and/or upsells, and loyalty information. The merchant account may further have one or more transaction histories, such as receipts for previous and/or current orders. As previously discussed, the information in the merchant account may be synchronized with the payment account. Moreover, information synchronized between the merchant account and the payment account may depend on access rights for both the merchant account and the payment account. In this way, the merchant may prevent unauthorized information from being transmitted to payment provider server 160 and vice versa. Thus, if user 102 does not wish to share certain information with merchant device 140, the information may be redacted/omitted from the payment account.

Based on the information received by sales application 150, sales application 150 may provide user 102 with specialized offers, upsells, discounts, and/or customized purchase orders for common items that the user purchases. These benefits may be determined by sales application 150 using a profile for user 102, the digital wallet for user 102 (e.g., other offers, discounts, and/or upsells), and/or transaction histories for user 102. Such offers may be presented to user 102 through merchant application 120. Sales application 150 may utilize updated information from payment provider server 160 to present these offers. Additionally, merchant device 140 may update database 146 with available offers for user 102.

Merchant device 140 includes other applications 144 as may be desired in particular embodiments to provide features to merchant device 140. For example, other applications 144 may include security applications for implementing server-side security features, programmatic client applications for interfacing with appropriate application programming interfaces (APIs) over network 180, or other types of applications. Other applications 144 may contain software programs, executable by a processor, including a graphical user interface (GUI) configured to provide an interface to a user and/or administrator of merchant device 140.

Merchant device 140 may further include database 146 which may include, for example, identifiers such as operating system registry entries, cookies associated with sales application 150 and/or other applications 144, identifiers associated with hardware of merchant device 140, or other appropriate identifiers, such as identifiers used for payment/user/device authentication or identification. Identifiers in database 146 may be used by a payment/service provider to associate merchant device 140 with a particular account maintained by the payment/service provider. Database 146 may include check-in information for user 102 and/or an identifier used by user 102 to connect with wireless beacon 132. Database 146 may also include information for a provisional merchant account and/or a synchronized merchant account for user 102, including information from a payment account with payment provider server 160. Such information may include a profile, digital wallet, and/or transaction histories for user 102. Database 146 may further store orders and/or payment by user 102 to be fulfilled by the merchant corresponding to merchant device 140. Such orders/payment may be recalled by user 102 using user device 110, as previously discussed.

Merchant device 140 includes at least one network interface component 148 adapted to communicate with user device 110 and/or payment provider server 160 over network 180. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacon 130 using short range communications, such as Bluetooth Low Energy, LTE Direct, radio frequency, infrared, Bluetooth, and near field communications.

Payment provider server 160 may be maintained, for example, by an online payment service provider, which may provide payment services for users (e.g., consumers) and/or merchants. In this regard, payment provider server 160 includes one or more processing applications, which may provide payment account services and synchronization of accounts between user 102 and merchant device 140. In one example, payment provider server 160 may be provided by PAYPAL®, Inc. of San Jose, Calif., USA. However, in other embodiments, payment provider server 160 may be maintained by or include a merchant, financial services provider, and/or other service provider, which may provide payment services to user 102. Although payment provider server 160 is described as separate from user device 110, it is understood that merchant device 140 may include one or more features provided by payment provider server 160.

Payment provider server 160 of FIG. 1 includes a mobile development application 162, a payment processing application 170, other applications 164, a database 166, and a network interface component 168. Mobile development application 162, payment processing application 170, and other applications 164 may correspond to processes, procedures, and/or applications, for example, a software program, executable by a hardware processor. In other embodiments, payment provider server 160 may include additional or different software as required.

Mobile development application 162 may correspond to an application providing processes, procedures, and/or features to a merchant for merchant device 140 that may be utilized in merchant application 120. In this regard, mobile development application 162 may offer a development tool set, such as a software development kit, which may be used by merchant device 140 in order to create and/or modify an application offered by merchant device 140, such as merchant application 120. Mobile development application 162 may include processes and interfaces that may be implemented in merchant application 120 and/or may include a generic application that may be customized to create merchant application 162. In various embodiments, mobile development application 162 may include a process and/or interface used to add an account creation and/or establishment application interface in merchant application 120. The interface may enable user 102 to establish a provisional merchant account and synchronize the provisional merchant account with a payment account for user 102 with payment provider server 160. Mobile development application 162 may also include processes to include payment processing using payment provider server 160 in merchant application 162. For example, mobile development application 162 may include processes for merchant application 120 that may provide payment to merchant device 140 through a payment account with payment provider server 160.

After merchant application 120 is developed and/or modifies using mobile development application 162, payment processing application 170 may enable user 102 to share information between a provisional merchant account established with merchant device 140 and a payment account established with payment provider server 160. In this regard, payment processing application 170 may establish a payment account with user 102. Payment processing application 170 may receive personal and/or financial information from user 102 to establish the account. Once the account is created, user 102 may utilize the account to process and issue payments to other users and/or merchants, as well as receive payments from the other users and/or merchants. Once the account is established, the account may include a profile for user 102, a digital wallet having payment instruments, discounts, gifts, and other payment/finance related information, and transaction histories for previous payments and transactions with one or more merchants, including the merchant for merchant device 140. The account may further include preference information or other related information that may be utilized by a merchant to upsell items, offer discounts, or present advertisements to user 102.

As previously discussed, user 102 may also establish a provisional merchant account with merchant device 140 and/or wish to synchronize an account with merchant device 140 with the payment account established with payment provider server 160. For example, merchant application 120 may include the aforementioned account establishment application interface where user 102 may set up an account for use with merchant device 140. If user 102 selects to enter information for a provisional merchant account, user 102 may choose to not synchronize the provisional account with the payment account in certain embodiments. Thus, the provisional account may remain with merchant device 140 and payment provider server 160 may not receive information included in the provisional merchant account. However, if while checking out with merchant device 140 and generating an account with merchant device 140, or at a later time, user 102 choose to synchronize and log in to the payment account in order to synchronize the two accounts, payment processing application 170 may update all relevant account information (e.g., the profile, wallet, and/or transaction histories) to reflect the correct information for user 102 in the provisional merchant account and the payment account. Payment processing application 170 may share the relevant information with merchant device 140. However, some information may not be shared with merchant device 140, such as relationships user 102 has with other merchants, confidential financial information, and other similar information.

Payment processing application 170 may also be configured to receive and/or transmit information from user device 110 and/or merchant device 140 for processing and completion of financial transactions. Payment processing application 170 may include one or more applications to process financial transaction information. Payment processing application 170 may receive a request to complete a sale transaction for an item with user device 110 and merchant device 140. Payment processing application 170 may complete the sale transaction by providing payment from user 102 to merchant device 140. Additionally, payment processing application 170 may provide transaction histories, including receipts, for use by user device 110 and/or merchant device 140 to complete a financial transaction.

In various embodiments, payment provider server 160 includes other applications 164 as may be desired in particular embodiments to provide features to payment provider server 160. For example, other applications 164 may include security applications for implementing server-side security features, programmatic server applications for interfacing with appropriate application programming interfaces (APIs) over network 180, or other types of applications. Other applications 164 may contain software programs, executable by a processor, including a graphical user interface (GUI), configured to provide an interface to a user.

Additionally, payment provider server 160 includes database 166. As previously discussed, user 102 and merchant device 140 may establish one or more payment accounts with payment provider server 160. Payment accounts in database 166 may include user information, such as name, address, birthdate, payment/funding information, additional user financial information, and/or other desired user data, including user identifiers/tokens for use in identifying the payment account. User 102 and merchant device 140 may link payment accounts to user device 110 and/or merchant device 140 through an identifier. Thus, when a device identifier corresponding to user device 110 is transmitted to payment provider server 160, e.g. from user device 110 and/or merchant device 140, a user account belonging to user 102 and/or merchant device 140 may be found. As previously discussed, user account (e.g., payment accounts) may include profile information, a digital wallet including payment instrument and benefits, and/or transaction histories. In other embodiments, user 102 and/or merchant device 140 may not have previously established a payment account and other financial instrument or information may be provided In various embodiments, payment provider server 160 includes at least one network interface component 168 adapted to communicate with user device 110, wireless beacon 130, and/or merchant device 140 over network 180. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
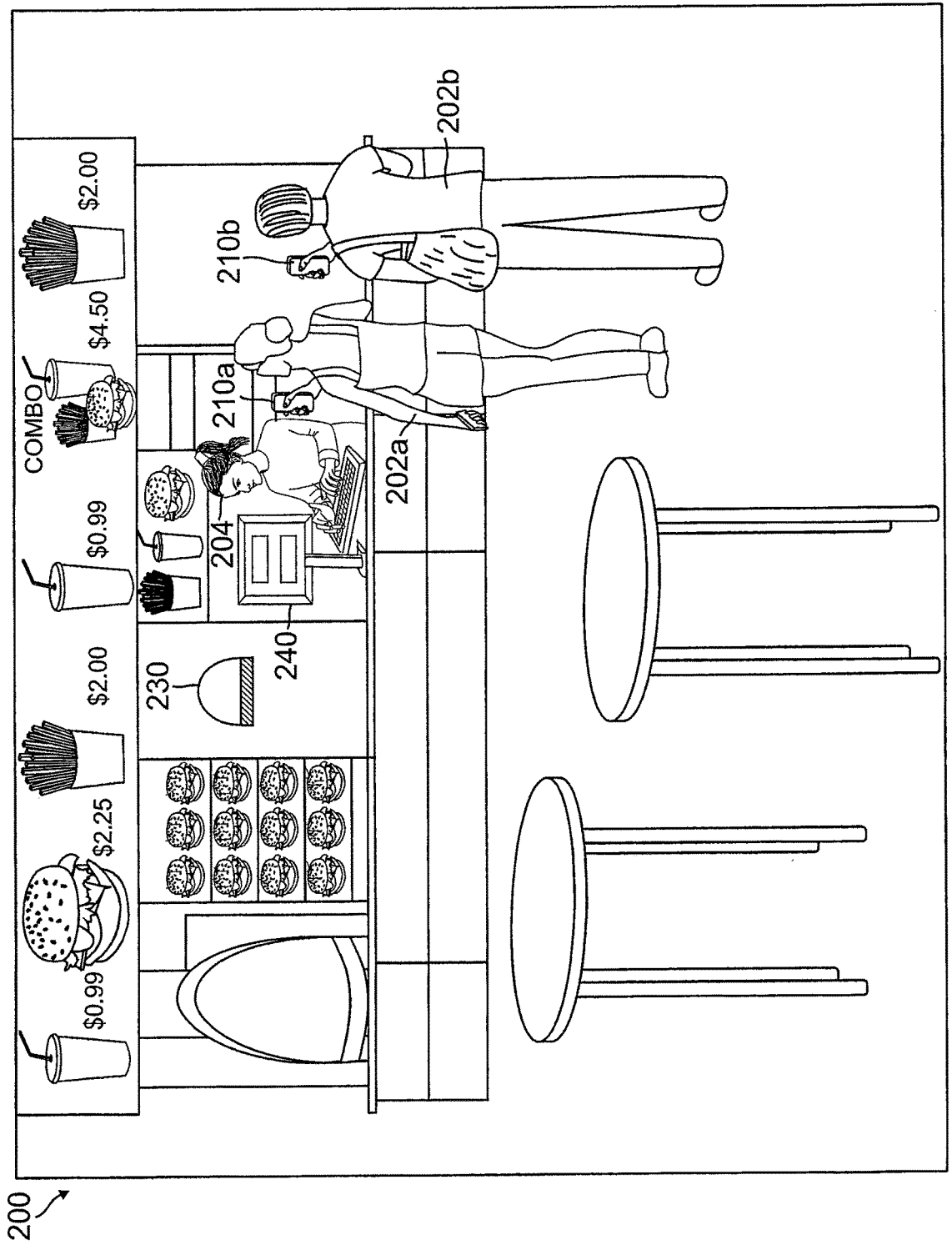
FIG. 2 is an exemplary merchant environment where a user may provide payments to the merchant using a merchant application after establishing a unified payment account, according to an embodiment.

FIG. 2 is an exemplary merchant environment where a user may provide payments to the merchant using a merchant application after establishing a unified payment account, according to an embodiment. Environment 200 of FIG. 2 includes a user 202a having a user device 210a and a user 202b having a user device 210b corresponding generally to user 102 and user device 110, respectively, of FIG. 1. Moreover, environment 200 includes a wireless beacon 230 and a merchant device 240 corresponding generally to wireless beacon 130 and merchant device 140, respectively, of FIG. 1.

In environment 200, two users, user 202a and user 202b, visit a merchant location where one or more items and/or services are sold. For example, in environment 200, it appears as though users 202a and 202b are visiting a fast food location. The location includes a merchant employee 204, such as a sales person, who controls merchant device 240 and may provide fulfillment of orders by users 202a and 202b. Prior to or when arriving at the location, users 202a and 202b may generate an order for fulfillment by merchant employee 204 using a merchant application on user devices 210a and 210b, respectively. As previously discussed, the merchant corresponding to the merchant location in environment 200 may create and/or modify the merchant application executed by user devices 210a and 210b using a development kit offered by a payment provider, where the payment provider may offer payment processing to the merchant and users 202a and 202b. After accessing the merchant application, users 202a and 202b may establish an account with the merchant using the merchant application. The account may be utilized to process a payment with the merchant and may be further utilized to receive account information, sales, and other offers from the merchant.

Once users 202a and 202b arrive at the merchant location in environment 200, user devices 210a and 210b, respectively, may be utilized to transmit and/or recall submitted orders for fulfillment by merchant employee 204. For example, user device 210a may connect to wireless beacon 230 when user 202a approaches merchant employee 204. The connection to wireless beacon 230 may cause the order to be transmitted to and/or recalled on merchant device 240. Merchant employee 204 may then view the order on merchant device 240, make changes, and/or fulfill the order for user 202a. In another example, user 202b may receive an order code, such as an alphanumeric identifier, barcode or QR code, or other identifying information for an order. User 202b may also receive a transaction history, such as a receipt, for the order. User 202b may utilize user device 210b to transmit the information to merchant device 240, or may provide the information to merchant employee 204.

Figure 3:
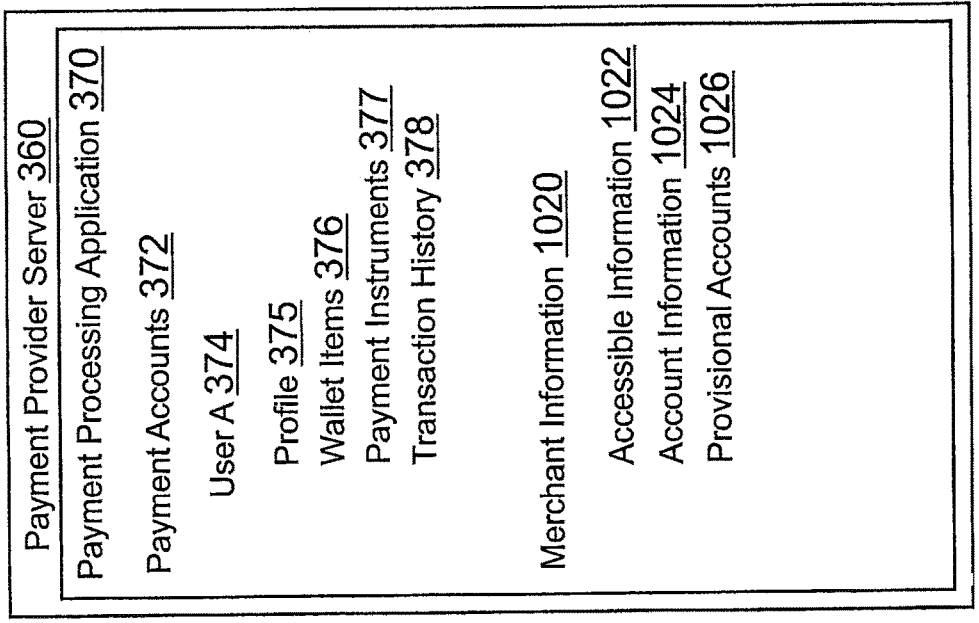
FIG. 3 is an exemplary system environment having a user device displaying a unified payment account establishment interface in a merchant device from a payment provider server, according to an embodiment.
Figure 3:
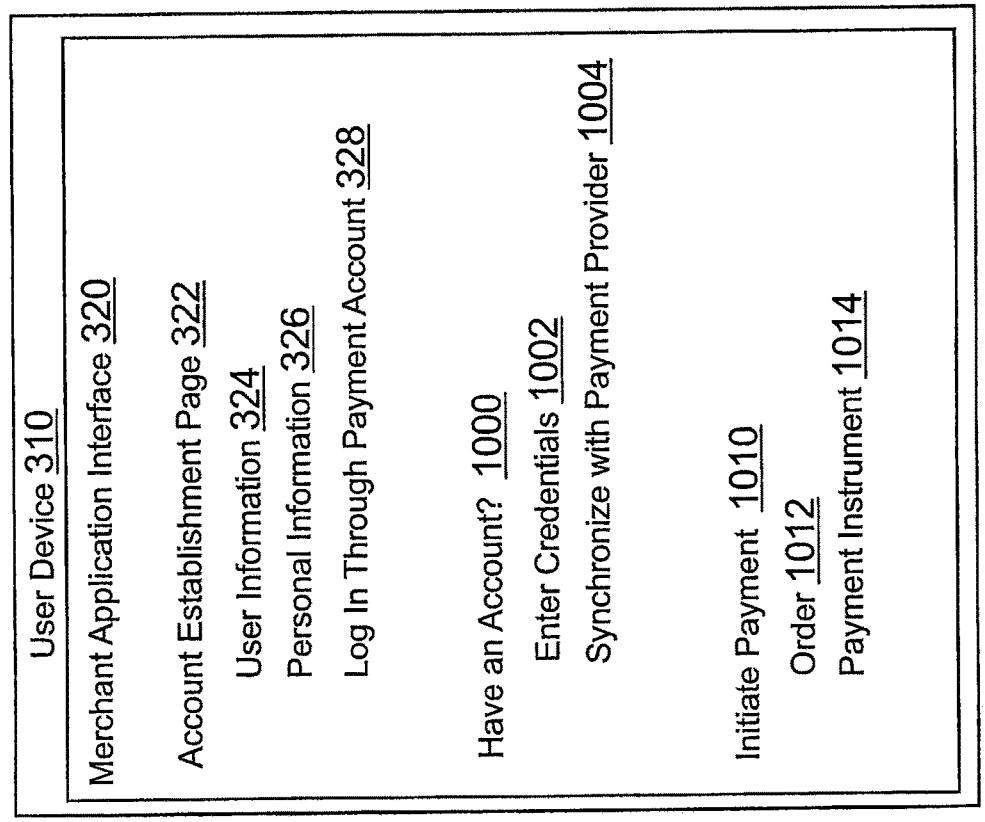

FIG. 3 is an exemplary system environment having a user device displaying a unified payment account establishment interface in a merchant device from a payment provider server, according to an embodiment. Environment 300 includes a user device 310 and a payment provider server 360 corresponding generally to user device 110 and payment provider server 160, respectively, of FIG. 1.

User device 110 displays a merchant application interface 320 corresponding generally to the processes and features described in reference to merchant application 120 of FIG. 1. Merchant application interface 320 includes an account establishment page 322 where a user for user device 310 may establish an account with a merchant, such as a provisional merchant account, which may initially or later may be synchronized with a payment account with payment provider server 360 to establish a synchronized merchant account with the merchant. In this regard, account establishment page 322 includes interface options to enter account information, such as user information 324 field, personal information 326 field, and log in through payment account 328 field. User information 324 may correspond to a field where the user of user device 310 may enter initial user information, such as an account name, password, and/or financial information necessary to establish the provisional merchant account. Personal information 326 may correspond to additional information requested for the provisional merchant account, such as a name, address, and/or billing address for the user. Additionally, the user may be given a choice to "log in through payment account 328," which may correspond to a process or field where payment account information may be added to that the merchant account may be synchronized with a payment account with payment provider server 360 and the merchant account may be generated using allowable information from the payment account.

In various embodiments, the provisional merchant account may be previously established but not synchronized with the payment account with payment provider server 360. Thus, options under "have an account?" 1000 may allow the user of user device 310 to enter in information to access the provisional merchant account. Enter credentials 1002 may provide for entry of the account name and/or password for the provisional merchant account. Moreover, synchronize with payment provider 1004 option may further allow the provisional merchant account to be synchronized with the payment account. Once an account is established using account establishment page 322, the user may navigate to initiate payment 1010, whereby the user may process and complete a payment to a merchant for an order. Thus, initiate payment 1010 includes order 1012 having the items/services the user wishes to purchase, and a selectable payment instrument 1014 to complete the payment.

Payment processing application 370 of payment provider server 360 corresponds generally to the described features and/or processes of payment processing application 170 of FIG. 1. Thus, payment processing application 370 may be utilized to establish and maintain a payment account for the user of user device 310 and synchronize the payment account with a merchant offer account services. In this regard, payment processing application 370 includes payment accounts 372 and merchant information 1020. Payment accounts 372 has a user A 374, such as an identifier for identification of a user (e.g., the user of user device 310) and their corresponding payment account. User A 374 further includes account information for a payment account, such as profile 375, wallet items 376, payment instruments 377, and a transaction history 378. Profile 375 may include user account and personal information, such as account names, person names, addresses, etc. Wallet items 376 may include store benefits, loyalty accounts, offers, upsells, and/or other financial information for user A 374 with at least one merchant. Payment instruments 377 may correspond to a subset of wallet items 376 and may include financial and payment instruments, such as bank accounts and payment cards. Transaction history 378 may correspond to at least one transaction history for user A 374 with at least one merchant, such as a receipt for an order and payment with a merchant.

Only certain information for the payment account under user A 374 may be shared with merchants. Thus, merchant information 1020 may be utilized to redact information when synchronizing a provisional merchant account with a payment account. Merchant information 1020 may include an identifier for a specific merchant as well as accessible information 1022, account information 1024, and provisional accounts 1026. Accessible information 1022 may correspond to settings about what information from a payment account may be presented to the merchant and what information is redacted when synchronizing two or more accounts. Accessible information 1022 may therefore include privacy settings dictating redacted profile, digital wallet, and/or transaction history information. Account information 1024 may correspond to an account held by the merchant with payment provider server 360, and may include wallet items and receiving accounts for the merchant. Provisional accounts 1026 may include information about the provisional merchant accounts established by users with the merchant, and information synchronized with those provisional merchant accounts, such as profile, digital wallet, and transaction history information.

Figure 4:
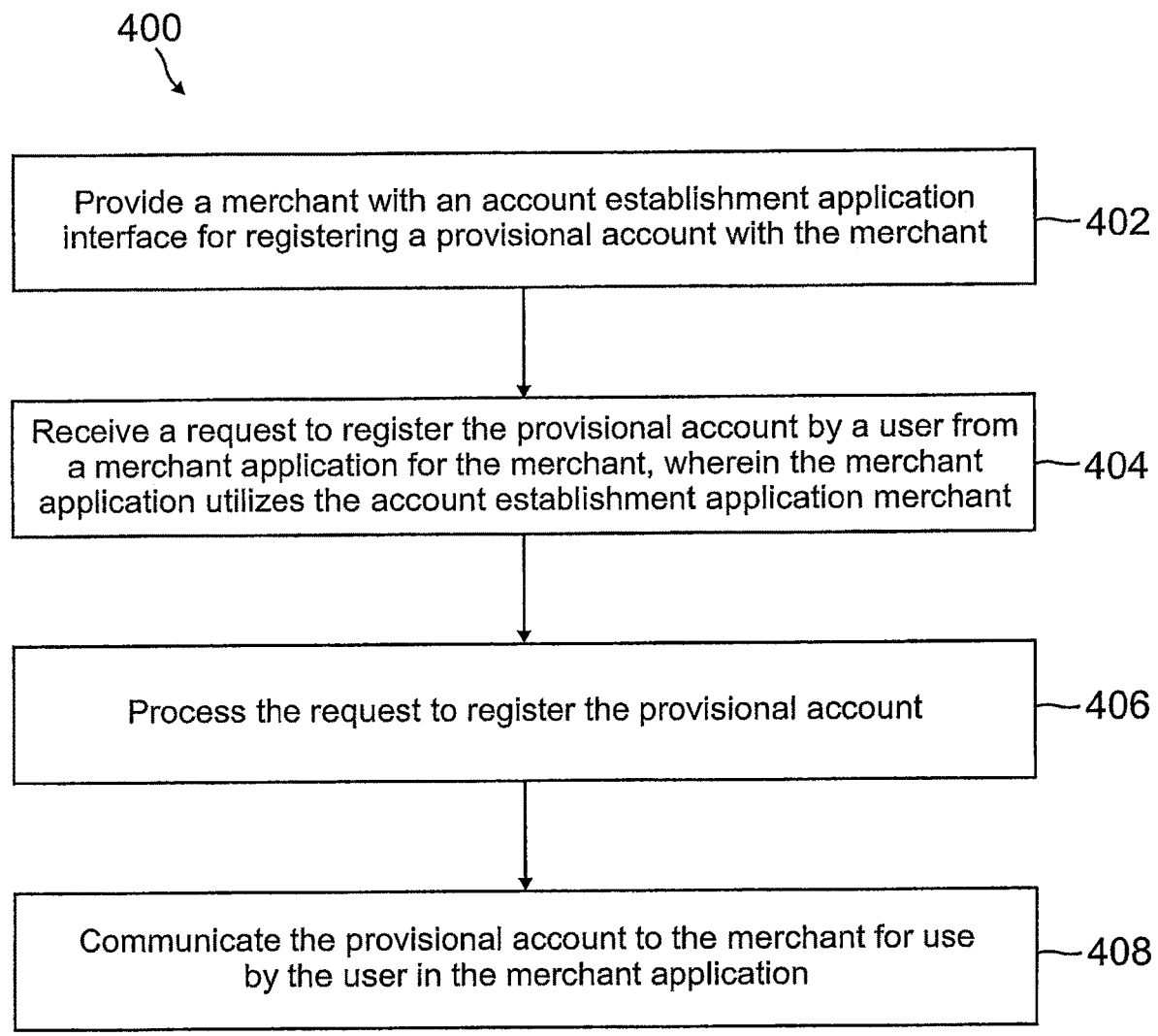
FIG. 4 is a flowchart of an exemplary process for provisional payment account establishment and incorporation in a main payment account, according to an embodiment.

FIG. 4 is a flowchart of an exemplary process for provisional payment account establishment and incorporation in a main payment account, according to an embodiment. Note that one or more steps, processes, and methods described herein may be omitted, performed in a different sequence, or combined as desired or appropriate.

At step 402, a merchant is provided with an account establishment application interface for registering a provisional account with the merchant. The provisional account may correspond to a merchant account with the merchant. A request to register the provisional account is received by the user from a merchant application for the merchant, at step 404, wherein the merchant application utilizes the account establishment application interface. The request to register the merchant account may be processed by synchronizing the merchant account with a payment account for a payment provider. The payment account may comprise at least one of a profile, a digital wallet, and a transaction history, wherein the merchant account may be synchronized with at least one of the profile, the digital wallet, and the transaction history. The merchant may receive access to viewing the at least one of the profile, the digital wallet, and the transaction history in the merchant account after synchronization with the payment account. In various embodiments, available merchant information may be determined in the payment account, wherein the available merchant information comprises information available to the merchant in the profile, the digital wallet, and the transaction history after redacting sensitive information from the digital wallet and the transaction history. Thus, the merchant account may be synchronized with the available merchant information in the payment account during synchronization of the merchant account with the payment account.

The request to register the provisional account is processed, at step 406. The provisional/merchant account may comprise at least one of payment instrument for the user and a transaction history for the user with the merchant. At step 408, the provisional/merchant account is communicated to the merchant for use by the user in the merchant application. In various embodiments, once the provisional merchant account is established, it may be synchronized with a payment account with a payment provider. Thus, a request to synchronize the merchant account with a payment account for the user with a payment provider may be received and merchant available information in the payment account for the merchant may be determined. The merchant account may be processed with the payment account to determine updates to the payment account, the merchant account may also be processed with the merchant available information, and the payment account may be updated with the updates to the payment account from the merchant account. Prior to processing the merchant account with the payment account to determine the updates to the payment account, the merchant account may comprise at least one of the payment instruments of the user with the merchant, a transaction history of the user with the merchant, and benefits for the user with the merchant. Additionally, prior to processing the merchant account with the merchant available information, the payment account may comprise a profile, a digital wallet comprising at least one payment instrument and benefits with at least one merchant, and a transaction history with the at least one merchant, the merchant available information may comprise information in the profile, the digital wallet, and the transaction history made available to the merchant. The provisional merchant account may also be processed with stored user information such as personal and/or financial information. Thus, a payment to the merchant for an order may be processed using the financial information.

In various embodiments, a payment request to the merchant may be processed using the provisional and/or synchronized merchant account. The payment request may be received from a user device of the user and comprise an order with the merchant. A payment may be provided to the merchant for the order and a transaction history for the payment communicated to the user. Additionally, an indication that the user device is connected to a wireless beacon at a merchant location for the merchant may be received and the order and/or the transaction history may be communicated to a merchant device at the merchant location. A payment code for the payment request may be generated for recalling the order, which may be communicated to a user device for the user. The payment code may then be displayed on the user device, wherein the merchant inputs the payment code to fulfill payment for the payment request. In various embodiments, the payment request may be transmitted to the merchant device for the merchant and a transaction history may be generated for the payment request and further communicated to the merchant device.

Figure 5:
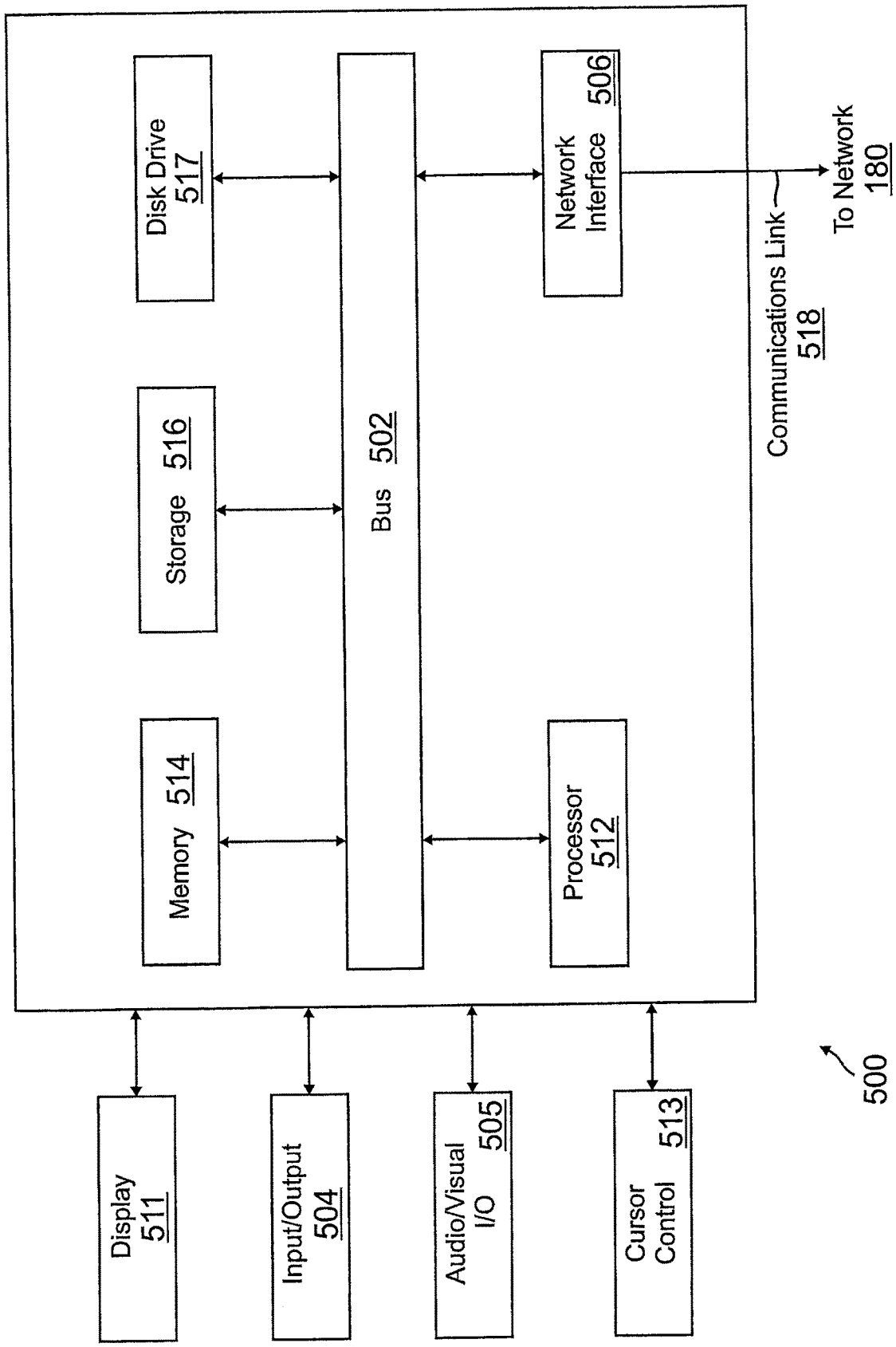
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 180. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory; and
    one or more hardware processors coupled to the non-transitory memory and configured to read instructions from the non-transitory memory to cause the system to perform operations comprising:
    receiving, via a merchant application of a merchant, a request from a user to create a merchant account of the user with the merchant from a mobile device of the user;
    determining an application operation configured with the merchant application that is provided by a service provider to the merchant for the merchant application;
    receiving, via the application operation from the merchant application of the merchant, an identifier corresponding to a service provider account of the user with the service provider;
    utilizing the identifier to identify the service provider account of the user;
    in response to identifying the service provider account of the user, causing, using the application operation with the merchant application, the merchant account to be created based on providing the merchant with access to information stored in association with the service provider account of the user;
    broadcasting, via a merchant wireless device at a merchant location of the merchant, a handshake request for devices within a short-range wireless proximity of the merchant wireless device;
    detecting the user at the merchant location based on a receipt of a check-in response from the merchant application executing on the mobile device in response to the handshake request;
    in response to the detecting the user, performing a check-in of the user at the merchant location using the merchant account independent of a user input to the device for the check-in;
    determining, via the merchant application, an account activity performed with the merchant account at the merchant location; and
    synchronizing, using the application operation, at least the account activity from the merchant account with the service provider account of the user with the service provider.

2. The system of claim 1, wherein the information stored in association with the service provider account includes information corresponding to an item, and wherein the operations further comprise:
    causing the information corresponding to the item to be displayed to the user via an interface in the merchant application.

3. The system of claim 1, the operations further comprising:
    causing information corresponding to an offer for an item to be displayed to the user via an interface in the merchant application based on analyzing the information stored in association with the service provider account of the user.

4. The system of claim 1, wherein the identifier corresponding to the service provider account of the user includes login credentials.

5. The system of claim 1, wherein the information stored in association with the service provider account of the user includes user profile information, a transactional history of the user, and payment information corresponding to the user.

6. The system of claim 1, wherein providing the merchant with access to the information stored in association with the service provider account of the user includes providing the merchant with access to only a portion of the information stored in association with the service provider account of the user.

7. The system of claim 1, wherein the information stored in association with the service provider account of the user includes user profile information or a transactional history associated with the service provider account of the user.

8. A method, comprising:
    receiving, by a computer system via a merchant application of a merchant, a request from a user to create a merchant account of the user with the merchant from a mobile device of the user;
    determining, by the computer system, an application operation configured with the merchant application that is provided by a service provider to the merchant for the merchant application;
    receiving, by the computer system via the application operation from the merchant application of the merchant, an identifier corresponding to a service provider account of the user with the service provider;
    utilizing, by the computer system, the identifier to identify the service provider account of the user;
    in response to identifying the service provider account of the user, causing, by the computer system using the application operation with the merchant application, the merchant account to be created based on providing the merchant with access to information stored in association with the service provider account of the user;
    broadcasting, via a merchant wireless device at a merchant location of the merchant, a handshake request for devices within a short-range wireless proximity of the merchant wireless device;
    detecting the user at the merchant location based on a receipt of a check-in response from the merchant application executing on the mobile device in response to the handshake request;
    in response to the detecting the user, performing a check-in of the user at the merchant location using the merchant account independent of a user input to the device for the check-in;
    determining, by the computer system via the merchant application, an account activity performed with the merchant account at the merchant location; and
    synchronizing, by the computer system using the application operation, at least the account activity from the merchant account with the service provider account of the user with the service provider.

9. The method of claim 8, wherein the information stored in association with the service provider account includes information corresponding to an item, and wherein the method further comprises:
 causing the information corresponding to the item to be displayed to the user via an interface in the merchant application.

10. The method of claim 8, further comprising:
 causing information corresponding to an offer for an item to be displayed to the user via an interface in the merchant application based on analyzing the information stored in association with the service provider account of the user.

11. The method of claim 8, wherein the identifier corresponding to the service provider account of the user includes login credentials.

12. The method of claim 8, wherein the information stored in association with the service provider account of the user includes user profile information, a transactional history of the user, and payment information corresponding to the user.

13. The method of claim 8, wherein providing the merchant with access to the information stored in association with the service provider account of the user includes providing the merchant with access to only a portion of the information stored in association with the service provider account of the user.

14. The method of claim 8, wherein the information stored in association with the service provider account of the user includes user profile information or a transactional history associated with the service provider account of the user.

15. A non-transitory computer-readable medium comprising instructions which, in response to execution by a computer system, cause the computer system to perform operations comprising:
 receiving, via a merchant application of a merchant, a request from a user to create a merchant account of the user with the merchant from a mobile device of the user;
 determining an application operation configured with the merchant application that is provided by a service provider to the merchant for the merchant application;
 receiving, via the application operation from the merchant application of the merchant, an identifier corresponding to a service provider account of the user with the service provider;
 utilizing the identifier to identify the service provider account of the user;
 in response to identifying the service provider account of the user, causing, using the application operation with the merchant application, the merchant account to be created based on providing the merchant with access to information stored in association with the service provider account of the user;
 broadcasting, via a merchant wireless device at a merchant location of the merchant, a handshake request for devices within a short-range wireless proximity of the merchant wireless device;
 detecting the user at the merchant location based on a receipt of a check-in response from the merchant application executing on the mobile device in response to the handshake request;
 in response to the detecting the user, performing a check-in of the user at the merchant location using the merchant account independent of a user input to the device for the check-in;
 determining, via the merchant application, an account activity performed with the merchant account at the merchant location; and
 synchronizing, using the application operation, at least the account activity from the merchant account with the service provider account of the user with the service provider.

16. The non-transitory computer-readable medium of claim 15, wherein the information stored in association with the service provider account includes information corresponding to an item, and wherein the operations further comprise:
 causing the information corresponding to the item to be displayed to the user via an interface in the merchant application.

17. The non-transitory computer-readable medium of claim 15, the operations further comprising:
 causing information corresponding to an offer for an item to be displayed to the user via an interface in the merchant application based on analyzing the information stored in association with the service provider account of the user.

18. The non-transitory computer-readable medium of claim 15, wherein the identifier corresponding to the service provider account of the user includes login credentials.

19. The non-transitory computer-readable medium of claim 15, wherein the information stored in association with the service provider account of the user includes user profile information, a transactional history of the user, and payment information corresponding to the user.

20. The non-transitory computer-readable medium of claim 15, wherein providing the merchant with access to the information stored in association with the service provider account of the user includes providing the merchant with access to only a portion of the information stored in association with the service provider account of the user.

* * * * *